United States Patent
Kim et al.

(10) Patent No.: US 11,689,806 B2
(45) Date of Patent: Jun. 27, 2023

(54) METHOD AND PHOTO SENSOR ASSEMBLY FOR SENSING ROTATIONAL POSITIONS OF A CAMERA MODULE, AND SURVEILLANCE CAMERA HAVING THE ASSEMBLY

(71) Applicant: HANWHA TECHWIN CO., LTD., Seongnam-si (KR)

(72) Inventors: Chang Yeon Kim, Seongnam-si (KR); Won Joon Kong, Seongnam-si (KR); Jong In Park, Seongnam-si (KR); Kyoung Jae Lee, Seongnam-si (KR); Ho Seoung Hwang, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 165 days.

(21) Appl. No.: 17/199,596

(22) Filed: Mar. 12, 2021

(65) Prior Publication Data

US 2021/0289124 A1 Sep. 16, 2021

(30) Foreign Application Priority Data

Mar. 16, 2020 (KR) .................. 10-2020-0032229

(51) Int. Cl.
*H04N 23/67* (2023.01)
*G02B 7/10* (2021.01)
(Continued)

(52) U.S. Cl.
CPC .............. *H04N 23/67* (2023.01); *G02B 7/102* (2013.01); *H04N 23/695* (2023.01); *H04N 25/704* (2023.01)

(58) Field of Classification Search
CPC .............. G02B 7/102; H04N 5/23212; H04N 5/23299; H04N 5/36961; H04N 23/67; H04N 23/695; H04N 25/704
See application file for complete search history.

(56) References Cited

U.S. PATENT DOCUMENTS

| | | | |
|---|---|---|---|
| 2005/0218314 A1* | 10/2005 | Urakawa | G01D 5/34784 250/231.18 |
| 2019/0072619 A1* | 3/2019 | Naka | G02B 7/08 |
| 2021/0289124 A1* | 9/2021 | Kim | G02B 7/102 |

FOREIGN PATENT DOCUMENTS

| | | |
|---|---|---|
| JP | 2013-157891 A | 8/2013 |
| JP | 2015-23675 A | 2/2015 |

* cited by examiner

*Primary Examiner* — Antoinette T Spinks
(74) *Attorney, Agent, or Firm* — Sughrue Mion, PLLC

(57) ABSTRACT

A photo sensor assembly may include: a rotator configured to rotate together with a camera module; a plurality of first photo interrupter bars disposed at a same interval along a first circumference on the rotator; a second photo interrupter bar disposed at a second circumference on the rotator; a first photo sensor disposed closer to the first circumference than to the second circumference, and configured to detect a first light-blocking pattern generated from the plurality of first photo interrupter bars; a second photo sensor disposed closer to the second circumference than to the first circumference, and configured to detect a second light-blocking pattern generated from the second photo interrupter bar; and a processor configured to estimate an initial position of the rotator based on the second light-blocking pattern and estimate a rotational angle from the initial position of the rotator based on the detected first light-blocking pattern.

20 Claims, 8 Drawing Sheets

(51) Int. Cl.
*H04N 23/695* (2023.01)
*H04N 25/704* (2023.01)

120

METHOD AND PHOTO SENSOR ASSEMBLY FOR SENSING ROTATIONAL POSITIONS OF A CAMERA MODULE, AND SURVEILLANCE CAMERA HAVING THE ASSEMBLY

CROSS-REFERENCE TO THE RELATED APPLICATION

This application claims priority from Korean Patent Application No. 10-2020-0032229, filed on Mar. 16, 2020 in the Korean Intellectual Property Office, the disclosure of which is incorporated by reference in its entirety.

BACKGROUND

1. Field

Apparatuses and methods consistent with example embodiments relate to a sensor assembly and a surveillance camera for estimating an angular position of a camera module, more specifically, to a sensor assembly having a photo interrupter sensor for estimating the angular position of the camera module according to whether a light receiver detects light emitted from a light emitter.

2. Description of the Related Art

A pan-tilt-zoom (PTZ) camera among surveillance cameras provides pan, tilt, and zoom functions to control the movement and position of the PTZ camera between predefined coordinate values. To this end, an error between the designated coordinate values and the coordinate values obtained from captured areas should be minimized. Generally, two separate steps may be needed to guarantee a precise preset drive of such a PTZ camera. The two separate steps include a first step for estimating an initial position of a camera coordinate and a second step for detecting positions of the camera periodically.

In order to secure the accuracy of the preset drive, a dedicated equipment may be needed to continuously detect the error between a rotation amount of a motor shaft and a rotation amount of a camera driven by the motor shaft. Such a position detecting sensor includes a hall sensor for detecting the magnetic field of the rotor and a photo interrupter (PI) sensor for detecting the light interruption by the rotation of the rotor.

The conventional hall sensor scheme has been generally used for simply sensing the initial position. That is, it has been used for estimating the closest position when a single-pole magnet gets close to the hall sensor and estimating the initial position based on the detected position. This hall sensor scheme has advantages of a low production cost and an easy manufacturing process, but also has disadvantages in that a feedback control is difficult because position information is not recognized unless the magnet passes through areas which are sensible by the hall sensor.

In addition, the hall sensor and the magnet should be close to each other and thus, it has additional disadvantages in that it needs separate drive modes, costs enough time for sensing the initial position and generates errors of the initial position according to approach directions.

On the other hand, the conventional PI sensor scheme uses photo interrupters instead of using changes in a magnetic field and has similar advantages and disadvantages as the hall sensor. The PI sensor is configured to receive periodical feedback signal, and thus, needs a complicated algorithm and an operation scenario. Accordingly, it restricts shapes of photo interrupter bars and costs long time to sense an initial position.

A conventional PI sensor assembly may require photo interrupter bars having different sizes from each other, and may need to perform a complicated operation to detect the initial position. In addition, it has a disadvantage that a user cannot detect signals in a uniform resolution since each photo interrupter bar has a different size from each other.

Accordingly, there is a need to improve such conventional photo sensors or PI sensors in order to quickly recognize the initial position by a simple driving and to measure the current position in a uniform and accurate resolution.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a photo sensor assembly configured to recognize the initial position of the photo sensor assembly in a quick and simple manner.

Further, one or more example embodiments provide a photo sensor assembly which may detect feedback signals at uniform or regular intervals in order to precisely estimate the current angular position of the photo sensor assembly based on the initial position recognized by the photo sensor assembly.

According to an aspect of an embodiment, there is provided a photo sensor assembly including: a rotator configured to rotate together with a camera module; a plurality of first photo interrupter bars disposed at a same interval along a first circumference on the rotator; a second photo interrupter bar disposed at a second circumference on the rotator, the second circumference being coaxially arranged with the first circumference; a first photo sensor disposed closer to the first circumference than to the second circumference, and configured to detect a first light-blocking pattern generated from the plurality of first photo interrupter bars; a second photo sensor disposed closer to the second circumference than to the first circumference, and configured to detect a second light-blocking pattern generated from the second photo interrupter bar; and a processor configured to estimate an initial position of the rotator based on the second light-blocking pattern and estimate a rotational angle from the initial position of the rotator based on the detected first light-blocking pattern.

The first circumference may be positioned not to overlap with a position of the second circumference in a radial direction of the rotator.

The second photo sensor may be configured to detect the initial position of the rotator while the rotator rotates once.

The first photo sensor may include a first light emitter configured to emit a first light and a first light receiver configured to detect whether the emitted first light is blocked by the plurality of first photo interrupter bars. The second photo sensor may include a second light emitter configured to emit a second light and a second light receiver configured to detect whether the emitted second light is blocked by the second photo interrupter bar.

The first and the second photo sensors may be disposed at different positions on a same surface of a circuit board of the photo sensor assembly.

The first and the second photo sensors may be disposed separately in a radial direction and a circumferential direction of the rotator.

The first photo sensor may be configured to detect the rotational angle of the rotator in a uniform resolution by using the plurality of first photo interrupter bars which has the same interval and a same width.

The second photo interrupter bar may be disposed to face empty spaces between the plurality of first photo interrupter bars in a radial direction of the rotator.

The processor may be further configured to count a number of pulses of the first light-blocking pattern from a time when the second light-blocking pattern is detected for a first time.

According to an aspect of another example embodiment, there is provided a surveillance camera including: a motor configured to generate a driving power; a transmission device configured to transfer the driving power generated by the motor; a rotator configured to rotate together with a camera module according to the transferred driving power; a plurality of first photo interrupter bars disposed at a same interval along a first circumference on the rotator; a second photo interrupter bar disposed at a second circumference on the rotator, the second circumference being coaxially arranged with the first circumference; a first photo sensor disposed closer to the first circumference than to the first circumference, and configured to detect a first light-blocking pattern generated from the plurality of first photo interrupter bars; a second photo sensor disposed closer to the second circumference than to the first circumference, and configured to detect a second light-blocking pattern generated from the second photo interrupter bar; and a processor configured to estimate an initial position of the rotator based on the second light-blocking pattern, and estimate a rotational angle from the initial position of rotator based on the first light-blocking pattern.

The first circumference may be positioned not to overlap with a position of the second circumference in a radial direction of the rotator.

The second photo sensor may be configured to detect the initial position of the rotator while the rotator rotates once.

The first photo sensor may include a first light emitter configured to emit a first light and a first light receiver configured to detect whether the emitted first light is blocked by the plurality of first photo interrupter bars. The second photo sensor may include a second light emitter for emitting a second light and a second light receiver configured to detect whether the emitted second light is blocked by the second photo interrupter bar.

The first and the second photo sensors may be disposed at different positions on a same surface of a circuit board of the surveillance camera.

The first and the second photo sensors may be disposed separately in a radial direction and a circumferential direction of the rotator.

The first photo sensor may be configured to detect the rotational angle of the rotator in a uniform resolution by using the plurality of first photo interrupter bars which has the same interval and a same width.

The second photo interrupter bar may be disposed to face empty spaces between the plurality of first photo interrupter bars in a radial direction of the rotator.

The processor may be further configured to contact a number of pulses of the first light-blocking pattern from a time when the second light-blocking pattern is detected for a first time.

According to an aspect of another example embodiment, there is provided a method for estimating angular positions of a camera module by a photo sensor assembly, the method including: rotating a rotator on which the camera module is mounted, the rotator including a plurality of first photo interrupter bars disposed at a same interval along a first circumference on the rotator, and a second photo interrupter bar disposed at a second circumference on the rotator, the second circumference being coaxially arranged with the first circumference; detecting by a first photo sensor, a first light-blocking pattern generated from the plurality of first photo interrupter bars; detecting by a second photo sensor, a second light-blocking pattern generated from the second photo interrupter bar; estimating an initial position of the rotator based on the second light-blocking pattern; and estimating a rotational angle from the initial position of the rotator based on the first light-blocking pattern.

The estimating the rotational angle may include counting a number of pulses of the first light-blocking pattern from a time when the second light-blocking pattern is detected for a first time.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
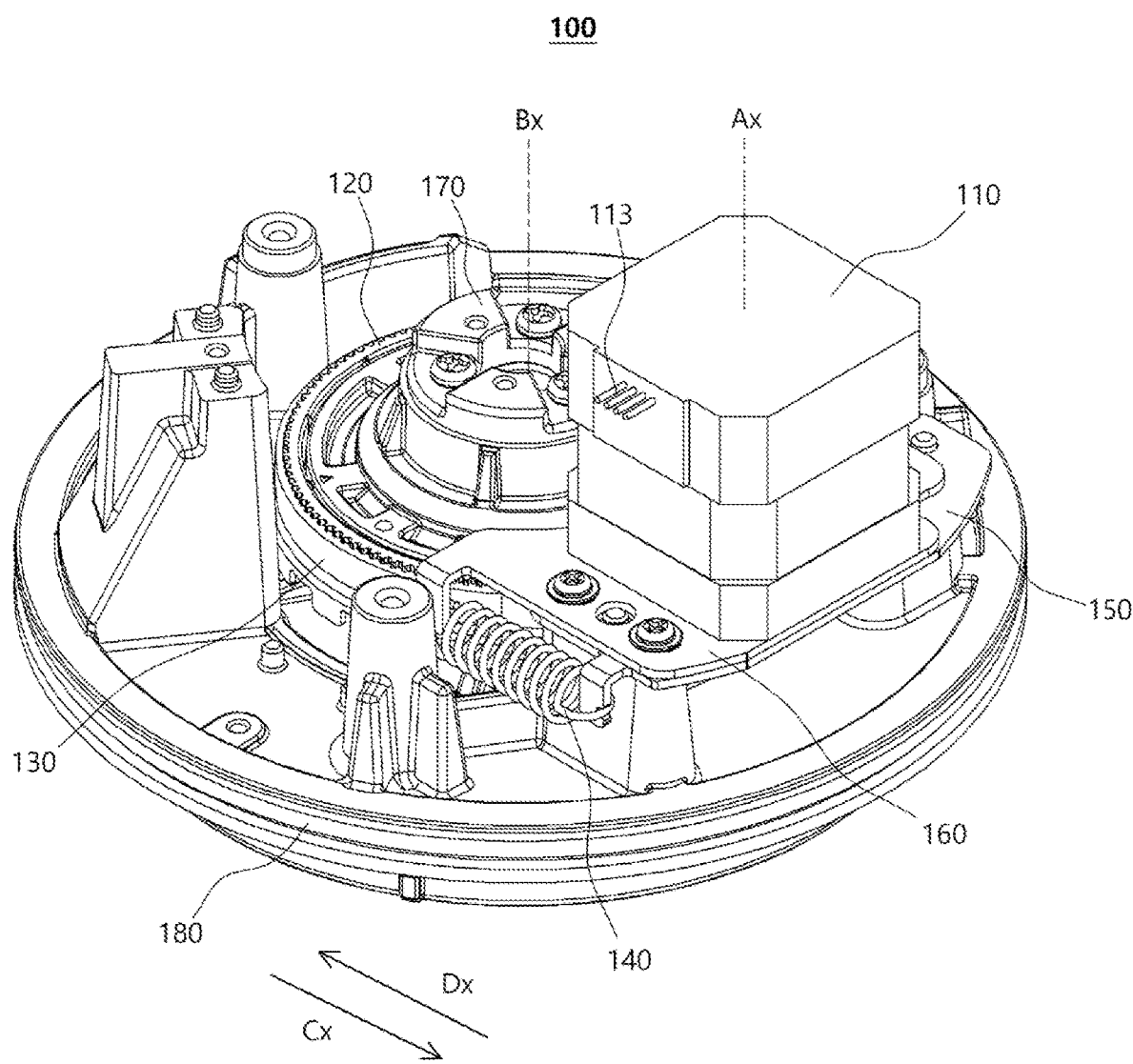
FIG. 1 is a perspective view of a surveillance camera according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used herein are for the purpose of describing embodiments and are not intended to be limiting of the disclosure. Herein, the singular also includes the plural unless specifically stated otherwise in the phrase. The term "comprises" and/or "comprising" as used herein does not exclude the presence or addition of one or more other components in addition to the mentioned components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. While such terms as "first," "second," etc., may be used to describe various elements, such elements must not be limited to the above terms. The above terms may be used only to distinguish one element from another.

Figure 2:
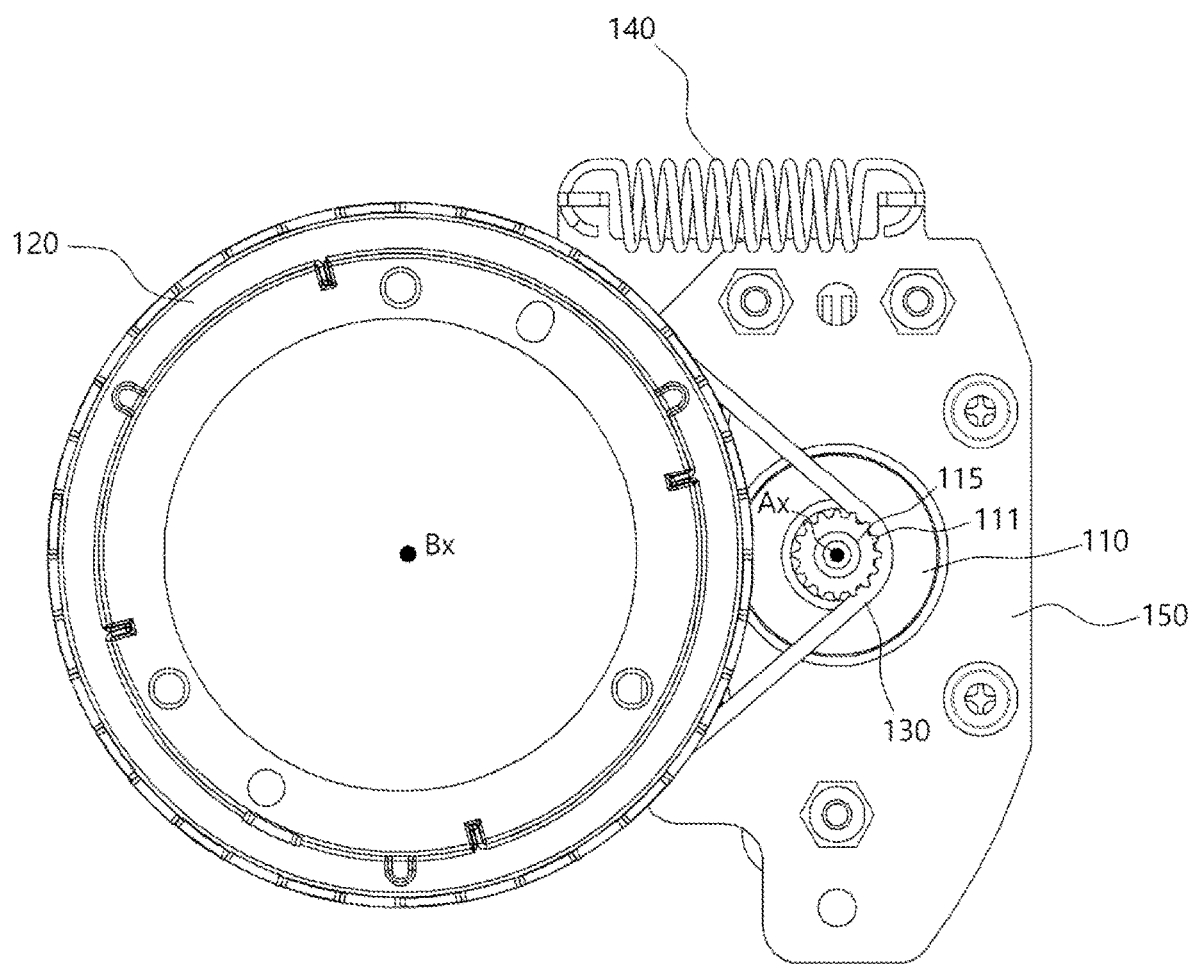
FIG. 2 is a bottom view of the surveillance camera according to an embodiment without a lower case.

FIG. 1 is a perspective view of a surveillance camera 100 according to an embodiment, and FIG. 2 is a bottom view of the surveillance camera 100 without a lower case 180. The surveillance camera 100 may include a motor 110, a rotation member (e.g., a rotator) 120, a timing belt 130, an elastic member 140, a base 150 and a movable member 160. A housing of the surveillance camera 100 may include a lower case 180 and an upper case that opposes the lower case 180.

The driving power generated from the motor 110 is transmitted to the motor shaft 115 which extends along a first axis Ax from the motor 110. Here, the motor 110 may connect through terminals 113 to a power supply to receive power from the power supply.

The driving power is also transmitted via a timing belt 130 to the rotation member 120 which is spaced from the first axis Ax and rotates around a second axis Bx. Specifically, the timing belt 130 is coupled with the motor shaft 115 and the rotation member 120 and converts the rotational motion of the motor shaft 115 to the rotational motion of the rotation member 120. Accordingly, a portion of the timing belt 130 close to a first axis Ax engages with an end (or an outer boundary) 111 of the motor shaft 115, and another portion of the timing belt 130 surrounding the second axis Bx engages with the outer circumferential surface of the rotation member 120.

A bracket 170 on which a camera module 190 (see FIG. 3C) is mounted is fixedly coupled to the rotation member 120 and rotates together with the rotation member 120. As a result, the camera module 190 also rotates according to the rotation of the rotation member 120.

To this end, the elastic member 140 applies a bias force in a direction Cx from the rotation member 120 toward the motor 101. The elastic member 140 of FIGS. 1 and 2 is illustrated as a coil spring, but it is not limited to the coil spring. The elastic member 140 may be implemented with other flexible members which are capable of applying tensions. According to an embodiment, the base 150 and the movable member 160 may be used such that the elastic member 140 applies such a force to the motor shaft 115.

Specifically, the movable member 160 is fixedly coupled to the motor 110 and rotatably coupled to the base 150. As such, based on an interaction among the movable member 160, the base 150 and the elastic member 140, the tension of the timing belt 130 applying a force in a direction Dx in which the motor shaft 115 becomes closer to the second axis Bx and the biasing force of the elastic member 140 applying a force in the direction Cx in which the motor shaft 115 becomes away from the second axis Bx are balanced such that the distance between the first axis Ax and the second axis Bx is adaptively adjusted. In addition, an assembly including the rotation member 120 and the bracket 170 is rotatably supported on a support member in the lower case 180 of the housing.

In FIG. 2, each of the base 150 and the movable member 160 includes a hollow, and each hollow is formed at the corresponding position. In this regard, the motor shaft 115 is disposed to pass through each hollow. Accordingly, the timing belt 130 is coupled to the end of the motor shaft 115 which passes through each hollow.

The surveillance camera 100 includes a photo sensor assembly 200 according to an embodiment, and the photo sensor assembly 200 has, at least, the rotation member 120 and photo sensors 211, 213 to detect angular positions or directions of the camera module 190. The rotation member 120 includes a plurality of photo interrupter bars and the photo sensors 211, 213 that detect a light-blocking pattern generated by the plurality of photo interrupter bars.

Figure 3A:
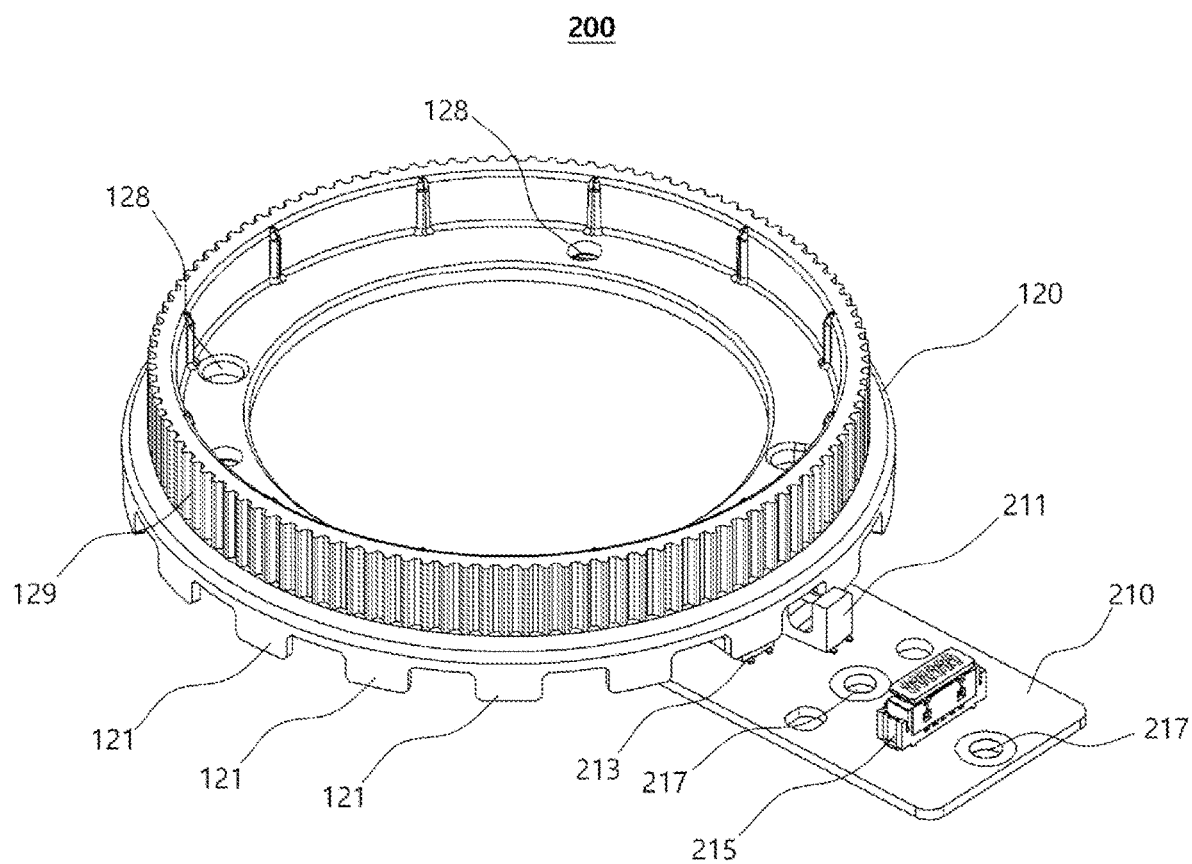
FIG. 3A is a perspective view of a photo sensor assembly according to an embodiment.
Figure 3B:
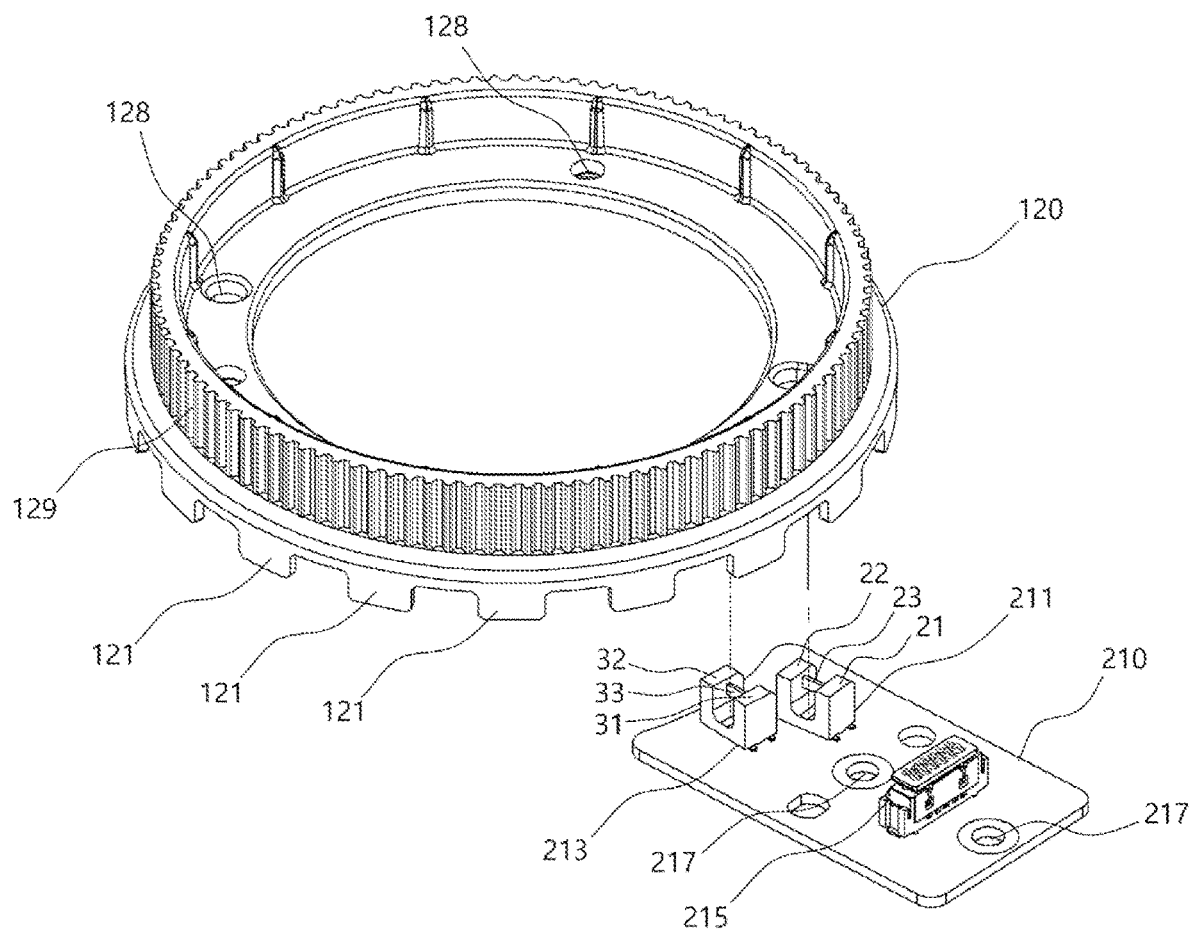
FIG. 3B is an exploded perspective view of the photo sensor assembly.
Figure 3C:
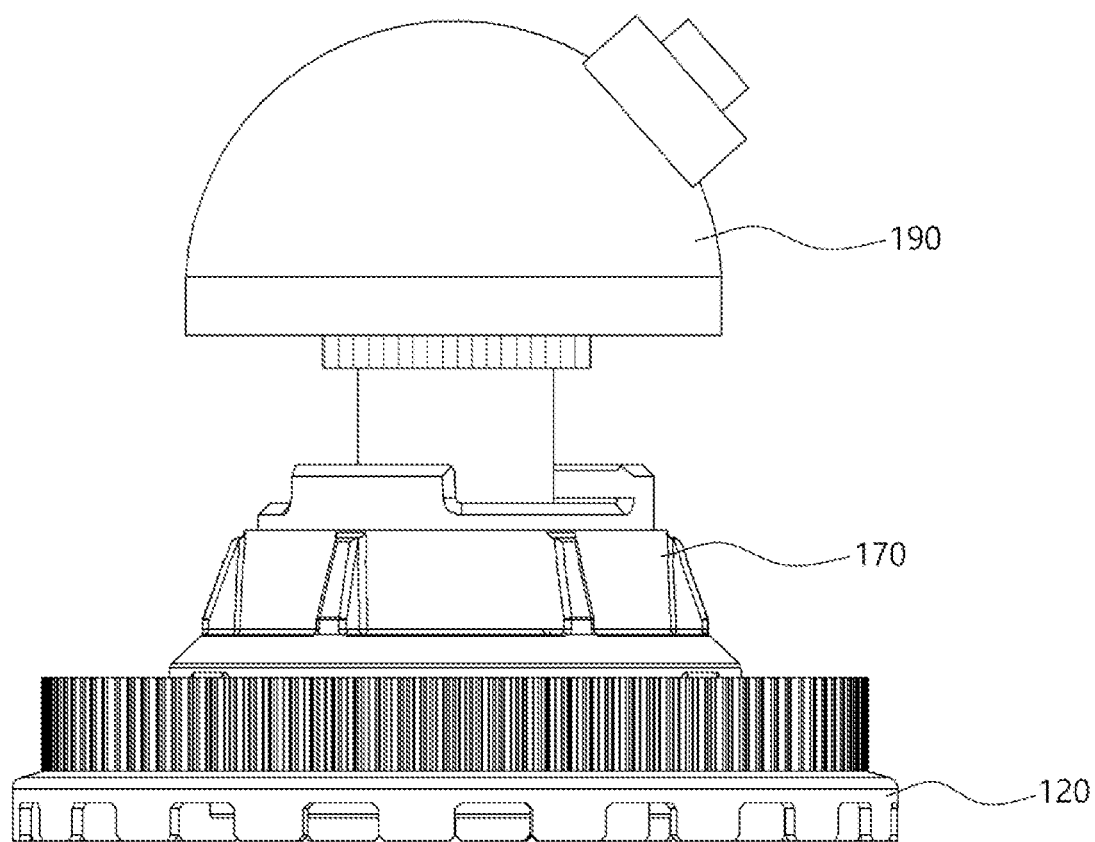
FIG. 3C illustrates a camera module included in the photo sensor assembly.

FIG. 3A is a perspective view of a photo sensor assembly 200 according to an embodiment, FIG. 3B is an exploded perspective view of the photo sensor assembly 200, and FIG. 3C illustrates the camera module 190 of the photo sensor assembly 200.

As described above, threads 129 are formed on the outer circumferential surface of the rotation member 120 and a power transmission device such as a timing belt 130 is coupled to the thread 129. Accordingly, the driving power from the motor 110 is transmitted to the rotation member 120 in the end. The camera module 190 is mounted on the rotation member 120, and thus, the camera module 190 rotates together with the rotation member 120. Accordingly, since the camera module 190 has the same motion as the rotation member 120, it is possible to determine the current position of the camera module 190 by measuring the initial position and the rotational angle of the rotation member 120. Through holes 128 may be defined on the rotation member 120 to be directly coupled to the camera module 190 or the bracket 170 on which the camera module 190 is mounted, by using fasteners.

On the other hand, a plurality of photo interrupter bars 121, 123 (in FIGS. 4A and 4B) are formed at the bottom of the outer circumferential surface of the rotation member 120 and the rotation of photo interrupter bars 121, 123 may be detected by photo sensors 211, 213. The photo sensors 211, 213 are disposed together on a circuit board 210. Each photo sensor generally includes a light emitter and a light receiver.

Accordingly, a first photo sensor 211 includes a first light emitter 21 for emitting light 23 and a first light receiver 22 for detecting whether the emitted light 23 is blocked by the plurality of first photo interrupter bars 121. In addition, the second photo sensor 213 includes a second light emitter 31 for emitting light 33 and a second light receiver 32 for detecting whether the emitted light 33 is blocked by the second photo interrupter bar 123. The circuit board 210 includes through holes 217 and fasteners that are inserted into through holes 217 such that the circuit board 210 is fixed on the lower case 180. Additionally, a connector socket 215 is disposed on the circuit board 210 to electrically connect the circuit board 210 to other circuit boards or a power supply.

Figure 4A:
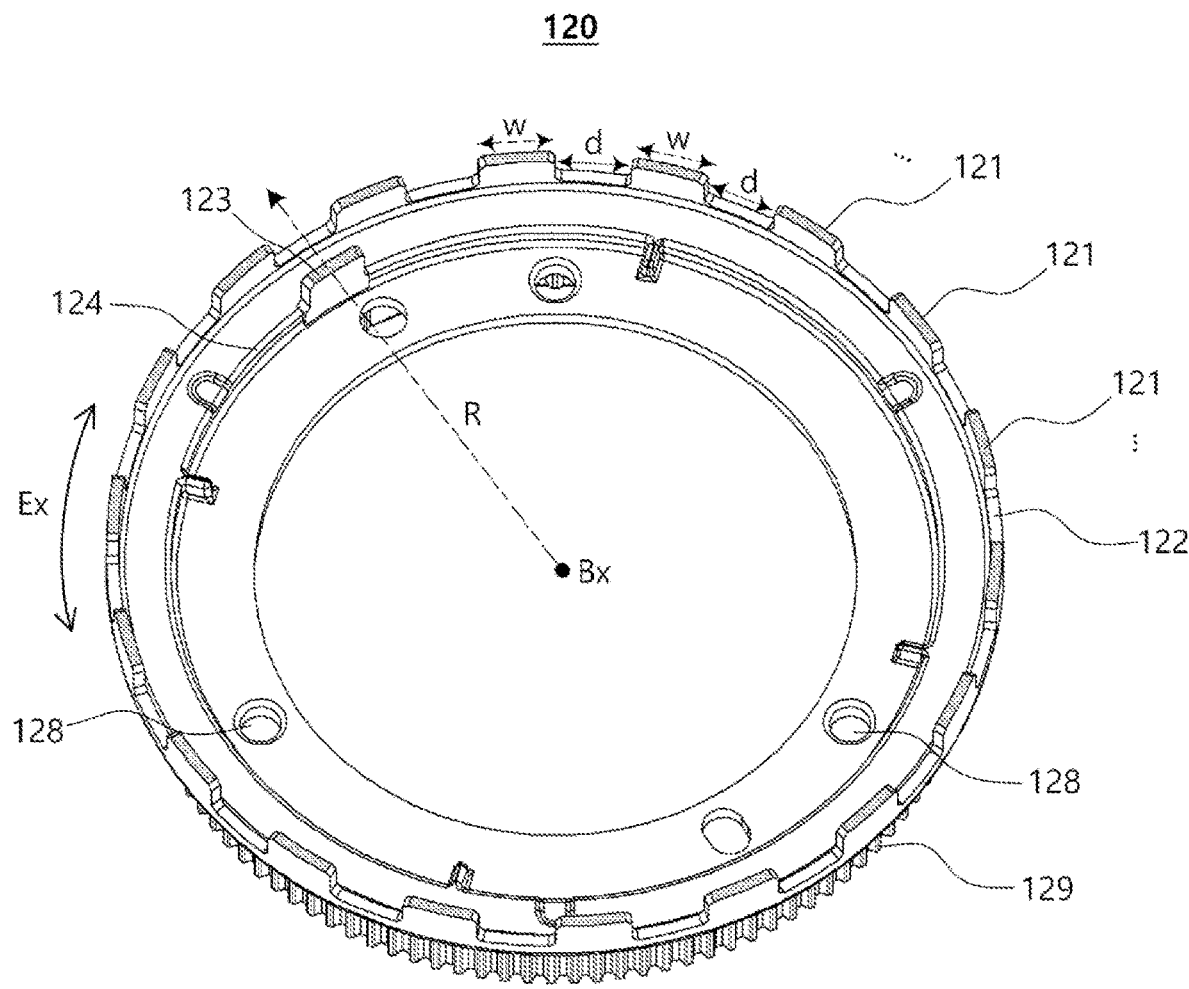
FIG. 4A is a perspective view of a rotation member from the bottom.
Figure 4B:
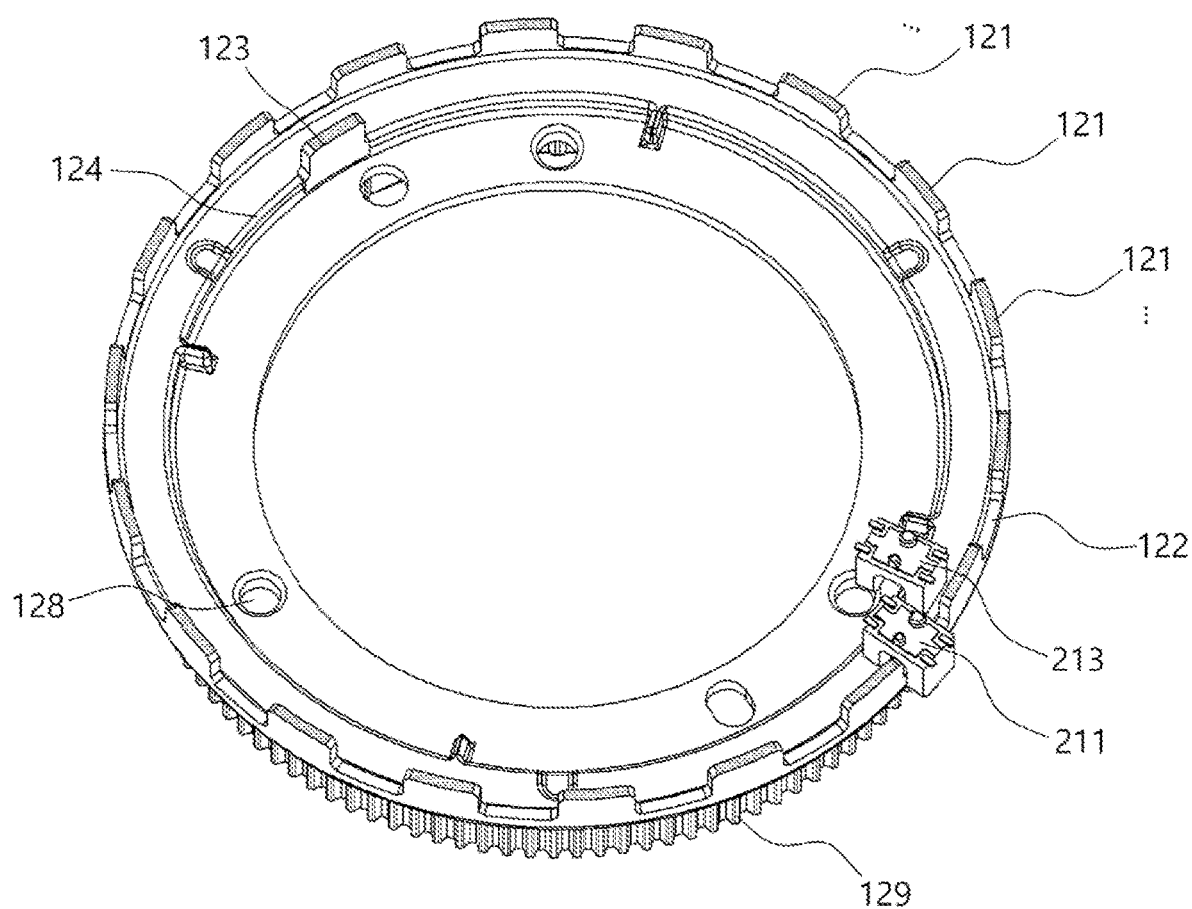
FIG. 4B is another perspective view of the rotation member with photo sensors.

FIG. 4A is a perspective view of a rotation member 120 from the bottom, and FIG. 4B is another perspective view of the rotation member 120 with photo sensors 211, 213. For brevity, the circuit board 210 is omitted in FIGS. 4A and 4B.

Referring to FIG. 4A, the rotation member 120 has a plurality of first photo interrupter bars 121 and a second photo interrupter bar 123. The plurality of first photo interrupter bars 121 are disposed at the same interval d and have the same width w along a first circumference 122 on the rotation member 120. In addition, the second photo interrupter bar 123 is disposed at a point of a second circumference 120 on the rotation member 120, and the second circumference 124 is coaxially aligned with the first circumference 122 to share the same center point. In this regard, the first circumference 122 is positioned outside the second circumference 124 in a radial direction R based on the rotation axis Bx such that the first and second circumferences 122, 124 do not interfere with each other.

Alternatively, according to another embodiment, the second circumference 124 may be positioned radially outside the first circumference 122. Accordingly, the second photo interrupter bar 123 for detecting the initial position may be misaligned with a plurality of first photo interrupter bars 121 in a circumferential direction Ex so that the position of the second photo interrupter bar 123 does not overlap with the position of any of the plurality of first photo interrupter bars 121 in the radial direction R to prevent the interference between the second photo interrupter bar 123 and the plurality of first photo interrupter bars 121.

As described in FIG. 4A, the first photo interrupter bars 121 are evenly arranged along the first circumference 122, and the second photo interrupter bar 123 is disposed at one point of the second circumference 124. It is because the first photo interrupter bars 121 need to be measured continuously to estimate real-time positions while the second photo interrupter bar 123 has only to be measured once to estimate the initial position during one rotation of the rotation member 120. However, alternatively, the second photo interrupter bar 123 may also include a plurality of photo interrupter bars as long as the plurality of photo interrupter bars can be uniquely distinguished.

Referring to FIG. 4B, the first photo sensor 211 is disposed close to the first circumference 122 (e.g., at a position closer to the first circumference 122 than to the second circumference 124) and detects a first light-blocking pattern generated from the plurality of first photo interrupter bars 121. In addition, the second photo sensor 213 is disposed close to the second circumference 124 (at a position closer to the second circumference 124 than to the first circumference 122) and detects a second light-blocking pattern generated from the second photo interrupter bar 123.

Accordingly, the first photo sensor 211 and second photo sensor 213 are disposed at the different positions on the same surface of a circuit board 210 not to interference with each other. Specifically, as described in FIG. 3B, the first photo sensor 211 and the second photo sensor 213 are closed to each other but separately spaced on the circuit board 210 in the radial direction and the circumferential direction of the rotation member 120.

The first photo sensor 211 detects the rotational angle of the rotation member 120 in a uniform resolution by using the plurality of first photo interrupter bars 121 which has the same interval d and the same width w. In addition, the second photo sensor 213 detects the initial position of the rotation member 120 while the rotation member 120 rotates once.

Figure 5:
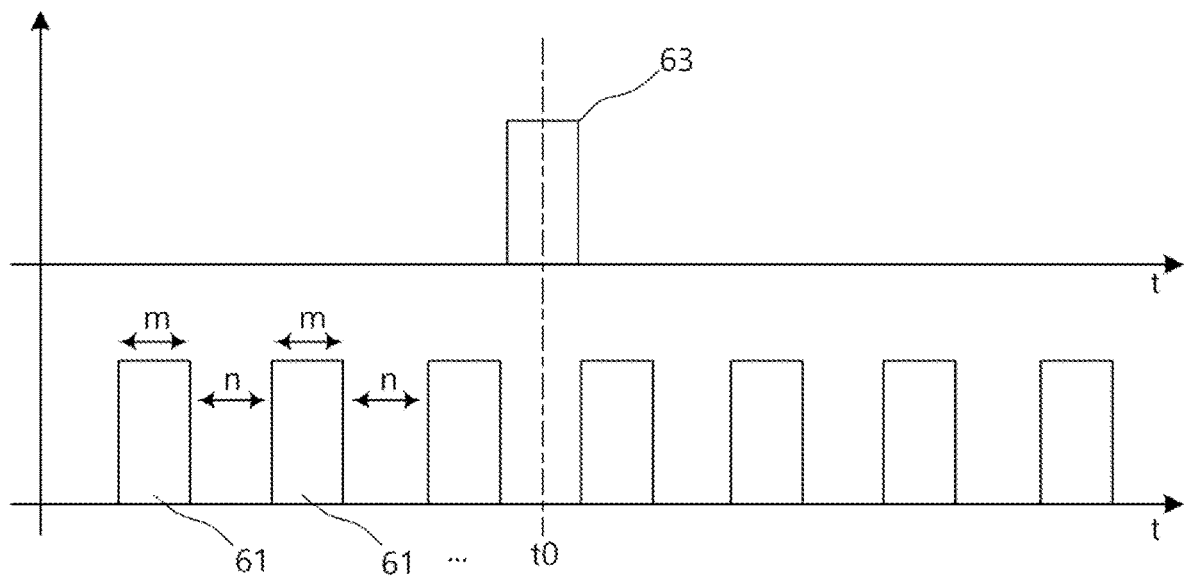
FIG. 5 is a graph illustrating along a time axis a first light-blocking and a second light-blocking pattern processed by a processor.
Figure 5:
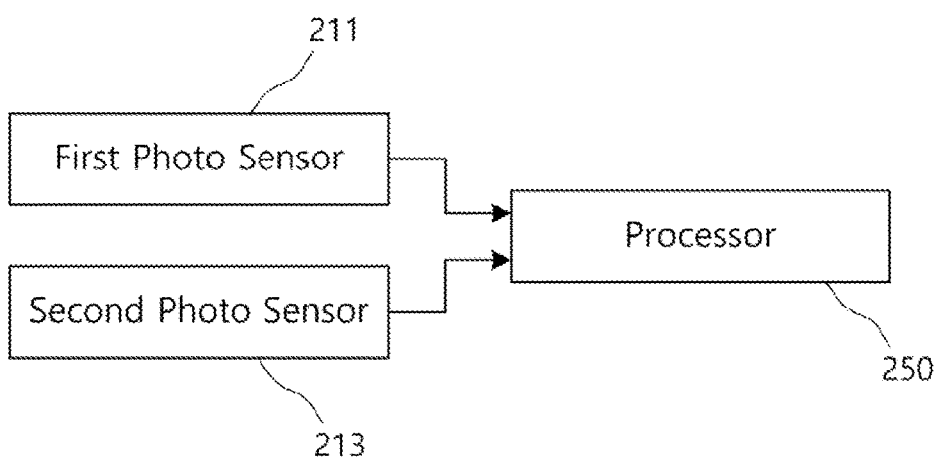

As such, the first light-blocking pattern detected by the first photo sensor 211 and the second light-blocking pattern detected by the second light-blocking pattern detected by the second photo sensor 213 are provided to a processor 250 (FIG. 5). The processor 250 has functions to load various processing instructions and threads on a volatile memory device such as a random-access memory (RAM) or a non-volatile memory device such as a read-only memory (ROM), and process those instructions and threads. Generally, it may be implemented by a central processing unit (CPU), a micro-processor, a field-programmable gate array (FPGA) or an application-specific integrated circuit (ASIC).

The processor 250 is configured to estimate the initial position of the rotation member 120 by using the detected second light-blocking pattern and estimate the rotational angle from the initial position of rotation member 120 by using the detected first light-blocking pattern. The sum of the initial position and the rotational angle finally indicates the current angular position of the rotation member 120.

FIG. 5 is a graph illustrating along a time axis a first and second light-blocking patterns 61, 63 processed by the processor 250. Here, the plurality of a first light-blocking pattern 61 are provided from the first photo sensor 211 and a second light-blocking pattern 63 is provided from the second photo sensor 213. The processor 250 may estimate the current angular position (rotational position) of the rotation member 120 or the camera module 190 by analyzing the first and second light-blocking patterns 61, 63. In FIG. 5, the first light-blocking pattern 61 is composed of a plurality of pulses with the same width m and the same interval n. The rotation angle of the rotation member 120 corresponding to a pulse passing by is inherently determined, for example, based on a simple proportional relation according to an arrangement of the first photo interrupter bars 121.

In FIG. 5, the second light-blocking pattern 63 is positioned to be corresponding to the idle interval n between a plurality of first light-blocking patterns 61. This is because the plurality of first photo interrupter bars 121 are disposed to correspond to the empty space between the plurality of a first photo interrupter bar 121 as described in FIG. 4B. As such, the processor 250 may reduce computational loads in case that the second light-blocking pattern 63 is generated at the idle interval of the plurality of first light-blocking patterns 61.

The processor 250 receives in real time the first light-blocking pattern 61 and the second light-blocking pattern 63. The position t0 indicated by the second light-blocking pattern 63 corresponds to the initial position of the rotation member 120 or the camera module 190, and thus, it is possible to correct errors generated from the accumulated rotational angle of the rotation member 120 based on the position to. In addition, when the power supply first provides power to the photo sensor assembly 200 in a surveillance camera, the initial position of the rotation member 120 or the camera module 190 cannot be identified at all, and thus, an initialization process is needed to find out the initial position. According to an embodiment, the photo sensor assembly 200 includes a first photo interrupter bars 121 and a second photo interrupter bar 123 which is coaxially disposed relative to the first photo interrupter bars 121, and thus, it is possible to recognize the initial position only by one rotation. Accordingly, it is also possible to recognize in real time the current rotational angle of the rotation member 120 by simply counting the number of the first light-blocking pattern 61 after recognizing the initial position from the second light-blocking pattern 63.

As a result, it is also possible to correctly control the camera module 190 in the direction instructed by a user or a program, by performing a feedback control on the motor 110 with a motor controller based on the current angular position of the camera module 190 calculated by the processor 250.

As describe above, according to an embodiment, the photo sensor assembly 200 has a dualized structure including a photo interrupter for sensing the initial position and another photo interrupter for sensing the rotational angles. Accordingly, the initial position is recognized with a minimized delay within one rotation and the rotational angle is also corrected instantaneously by using the reference position t0. Further, it is possible to uniformly maintain the width and the interval of the plurality of first photo interrupter bars 121 and improve the sensing resolution to be under 10° by decreasing the width and the size.

According to an embodiment, a method for estimating the angular position of the camera module 190 by using the above photo sensor assembly, includes the following steps.

First, the rotation member 120 on which the camera module 190 is mounted rotates according to the driving power generated by the motor 110 and transmitted via the timing belt 130.

Specifically, the rotation member 120 includes a plurality of first photo interrupter bars 121 disposed at the same interval and having the same width along a first circumference 122 on the rotation member 120, and a second photo interrupter bar 123 disposed at a point of a second circumference 124 on the rotation member 120. Here, the second circumference 124 is coaxially arranged with the first circumference 122.

When the rotation member 120 rotates, the first photo sensor 211 detects the first light-blocking pattern 61 generated from the plurality of first photo interrupter bars 121, and the second photo sensor 213 detects a second light-blocking pattern 63 generated from the second photo interrupter bar 123.

Next, the processor 250 recognizes the initial position t0 of the rotation member 120 based on the detected second light-blocking pattern 63 and estimates the rotation angle from the initial position t0 of the rotation member 120 based on the detected first light-blocking pattern 61. Finally, the processor 250 may estimate the rotational angle by counting the number of the first light-blocking pattern 61 from the time when the second light-blocking pattern 63 is recognized for the first time.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A photo sensor assembly comprising:
a rotator configured to rotate together with a camera module;
a plurality of first photo interrupter bars disposed at a same interval along a first circumference on the rotator;
a second photo interrupter bar disposed at a second circumference on the rotator, the second circumference being coaxially arranged with the first circumference;
a first photo sensor disposed closer to the first circumference than to the second circumference, and configured to detect a first light-blocking pattern generated from the plurality of first photo interrupter bars;
a second photo sensor disposed closer to the second circumference than to the first circumference, and configured to detect a second light-blocking pattern generated from the second photo interrupter bar; and
a processor configured to estimate an initial position of the rotator based on the second light-blocking pattern and estimate a rotational angle from the initial position of the rotator based on the detected first light-blocking pattern,
wherein a position of the second photo interrupter bar does not overlap a position of any of the first photo interrupter bars in a circumferential direction of the rotator, and the second light-blocking pattern is obtained at an idle interval between a plurality of pulses that form the first light-blocking pattern.

2. The photo sensor assembly of claim 1, wherein the first circumference is positioned not to overlap a position of the second circumference in a radial direction of the rotator.

3. The photo sensor assembly of claim 1, wherein the second photo sensor is configured to detect the initial position of the rotator while the rotator rotates once.

4. The photo sensor assembly of claim 1, wherein the first photo sensor comprises a first light emitter configured to emit a first light and a first light receiver configured to detect whether the emitted first light is blocked by the plurality of first photo interrupter bars, and
wherein the second photo sensor comprises a second light emitter configured to emit a second light and a second light receiver configured to detect whether the emitted second light is blocked by the second photo interrupter bar.

5. The photo sensor assembly of claim 4, wherein the first and the second photo sensors are disposed at different positions on a same surface of a circuit board of the photo sensor assembly.

6. The photo sensor assembly of claim 5, wherein the first and the second photo sensors are disposed separately in a radial direction and the circumferential direction of the rotator.

7. The photo sensor assembly of claim 1, wherein the first photo sensor is configured to detect the rotational angle of the rotator in a uniform resolution by using the plurality of first photo interrupter bars which has the same interval and a same width.

8. The photo sensor assembly of claim 1, wherein the second photo interrupter bar is disposed to face empty spaces between the plurality of first photo interrupter bars in a radial direction of the rotator.

9. The photo sensor assembly of claim 1, wherein the processor is further configured to count a number of the plurality of pulses of the first light-blocking pattern from a time when the second light-blocking pattern is detected for a first time.

10. A surveillance camera comprising:
a motor configured to generate a driving power;
a transmission device configured to transfer the driving power generated by the motor;
a rotator configured to rotate together with a camera module according to the transferred driving power;
a plurality of first photo interrupter bars disposed at a same interval along a first circumference on the rotator;
a second photo interrupter bar disposed at a second circumference on the rotator, the second circumference being coaxially arranged with the first circumference;
a first photo sensor disposed closer to the first circumference than to the first circumference, and configured to detect a first light-blocking pattern generated from the plurality of first photo interrupter bars;
a second photo sensor disposed closer to the second circumference than to the first circumference, and configured to detect a second light-blocking pattern generated from the second photo interrupter bar; and
a processor configured to estimate an initial position of the rotator based on the second light-blocking pattern, and estimate a rotational angle from the initial position of rotator based on the first light-blocking pattern,
wherein a position of the second photo interrupter bar does not overlap a position of any of the plurality of first photo interrupter bars in a circumferential direction of the rotator, and the second light-blocking pattern is obtained at an idle interval between a plurality of pulses that form the first light-blocking pattern.

11. The surveillance camera of claim 10, wherein the first circumference is positioned not to overlap a position of the second circumference in a radial direction of the rotator.

12. The surveillance camera of claim 10, wherein the second photo sensor is configured to detect the initial position of the rotator while the rotator rotates once.

13. The surveillance camera of claim 10, wherein the first photo sensor comprises a first light emitter configured to emit a first light and a first light receiver configured to detect whether the emitted first light is blocked by the plurality of first photo interrupter bars, and
wherein the second photo sensor comprises a second light emitter for emitting a second light and a second light receiver configured to detect whether the emitted second light is blocked by the second photo interrupter bar.

14. The surveillance camera of claim 13, wherein the first and the second photo sensors are disposed at different positions on a same surface of a circuit board of the surveillance camera.

15. The surveillance camera of claim 14, wherein the first and the second photo sensors are disposed separately in a radial direction and the circumferential direction of the rotator.

16. The surveillance camera of claim 10, wherein the first photo sensor is configured to detect the rotational angle of the rotator in a uniform resolution by using the plurality of first photo interrupter bars which has the same interval and a same width.

17. The surveillance camera of claim 10, wherein the second photo interrupter bar is disposed to face empty spaces between the plurality of first photo interrupter bars in a radial direction of the rotator.

18. The surveillance camera of claim 10, wherein the processor is further configured to contact a number of the plurality of pulses of the first light-blocking pattern from a time when the second light-blocking pattern is detected for a first time.

19. A method for estimating angular positions of a camera module by a photo sensor assembly, the method comprising:
rotating a rotator on which the camera module is mounted, the rotator comprising a plurality of first photo interrupter bars disposed at a same interval along a first circumference on the rotator, and a second photo interrupter bar disposed at a second circumference on the rotator, the second circumference being coaxially arranged with the first circumference;
detecting by a first photo sensor, a first light-blocking pattern generated from the plurality of first photo interrupter bars;
detecting by a second photo sensor, a second light-blocking pattern generated from the second photo interrupter bar;
estimating an initial position of the rotator based on the second light-blocking pattern; and
estimating a rotational angle from the initial position of the rotator based on the first light-blocking pattern,
wherein a position of the second photo interrupter bar does not overlap a position of any of the plurality of first photo interrupter bars in a circumferential direction of the rotator, and the second light-blocking pattern is obtained at an idle interval between a plurality of pulses that form the first light-blocking pattern.

20. The method of claim 19, wherein the estimating the rotational angle comprises counting a number of the plurality of pulses of the first light-blocking pattern from a time when the second light-blocking pattern is detected for a first time.

* * * * *